(12) United States Patent
Kataoka

(10) Patent No.: US 8,521,363 B2
(45) Date of Patent: Aug. 27, 2013

(54) DRIVING ASSIST SYSTEM

(75) Inventor: Hiroaki Kataoka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 579 days.

(21) Appl. No.: 12/227,396

(22) PCT Filed: Jun. 5, 2007

(86) PCT No.: PCT/JP2007/061683
§ 371 (c)(1),
(2), (4) Date: Nov. 17, 2008

(87) PCT Pub. No.: WO2007/142345
PCT Pub. Date: Dec. 13, 2007

(65) Prior Publication Data
US 2009/0171533 A1    Jul. 2, 2009

(30) Foreign Application Priority Data
Jun. 7, 2006    (JP) .................................. 2006-158417

(51) Int. Cl.
*G05D 1/00*    (2006.01)
*G05D 3/00*    (2006.01)

(52) U.S. Cl.
USPC .......................................................... 701/41

(58) Field of Classification Search
USPC .......................................................... 701/41
See application file for complete search history.

(56) References Cited

U.S. PATENT DOCUMENTS

| | | | | |
|---|---|---|---|---|
| 6,129,025 A | * | 10/2000 | Minakami et al. | 104/88.01 |
| 6,152,255 A | * | 11/2000 | Noro et al. | 180/446 |
| 6,185,492 B1 | | 2/2001 | Kagawa et al. | |
| 6,252,667 B1 | * | 6/2001 | Hill et al. | 356/487 |
| 6,311,119 B2 | * | 10/2001 | Sawamoto et al. | 701/96 |
| 6,411,867 B1 | * | 6/2002 | Sakiyama et al. | 701/1 |
| 6,571,176 B1 | | 5/2003 | Shinmura et al. | |
| 7,734,419 B2 | | 6/2010 | Kondoh | |
| 7,755,511 B2 | | 7/2010 | Yamamoto et al. | |
| 7,765,066 B2 | | 7/2010 | Braeuchle et al. | |
| 2001/0014846 A1 | * | 8/2001 | Sawamoto et al. | 701/96 |
| 2003/0233187 A1 | | 12/2003 | Egami | |
| 2003/0236602 A1 | | 12/2003 | Kuge et al. | |

(Continued)

FOREIGN PATENT DOCUMENTS

| | | |
|---|---|---|
| DE | 102 18 010 A1 | 11/2003 |
| DE | 103 51 986 | 6/2005 |

(Continued)

OTHER PUBLICATIONS

JP 2001-048036 in JPO English Translation.*

(Continued)

*Primary Examiner* — Ian Jen
(74) *Attorney, Agent, or Firm* — Oliff & Berridge, PLC

(57) ABSTRACT

A driving assist system assists steering such that a vehicle travels along a set target course. A steering torque sensor detects a steering torque that serves as a steering operation input value generated by a driver. If the steering torque value is equal to or greater than a preset reference value and a direction corresponding to the steering torque is a direction away from another vehicle present ahead in an adjacent lane, then an ECU corrects the target course to a course that moves away from the other vehicle.

14 Claims, 10 Drawing Sheets

(56) References Cited

U.S. PATENT DOCUMENTS

| | | |
|---|---|---|
| 2005/0024258 A1 | 2/2005 | Matsuoka et al. |
| 2005/0228588 A1 | 10/2005 | Braeuchle et al. |
| 2007/0027597 A1 | 2/2007 | Breuel et al. |
| 2009/0157247 A1 | 6/2009 | Sjögren et al. |
| 2009/0171533 A1 | 7/2009 | Kataoka |
| 2009/0326752 A1 | 12/2009 | Staempfle et al. |
| 2010/0036578 A1 | 2/2010 | Taguchi et al. |
| 2011/0137488 A1 | 6/2011 | Sakugawa |

FOREIGN PATENT DOCUMENTS

| | | |
|---|---|---|
| EP | 1 527 941 A2 | 5/2005 |
| EP | 1 527 973 A1 | 5/2005 |
| EP | 2 025 577 A1 | 2/2009 |
| JP | A-2001-1927 | 1/2001 |
| JP | A-2001-48035 | 2/2001 |
| JP | A-2001-48036 | 2/2001 |
| JP | A-2002-25000 | 1/2002 |
| JP | A-2002-274402 | 9/2002 |
| JP | A-2002-331849 | 11/2002 |
| JP | A-2004-136787 | 5/2004 |
| JP | A-2004-199286 | 7/2004 |
| JP | A-2004-206451 | 7/2004 |
| JP | A-2005-62912 | 3/2005 |
| JP | A-2005-524135 | 8/2005 |
| JP | A-2005-324782 | 11/2005 |
| JP | A-2006-321299 | 11/2006 |
| JP | A-2007-534041 | 11/2007 |
| JP | A-2007-326447 | 12/2007 |
| JP | A-2008-123197 | 5/2008 |
| WO | WO 03/091813 A1 | 11/2003 |
| WO | WO 2010/122639 A1 | 10/2010 |

OTHER PUBLICATIONS

Jan. 25, 2013 Office Action issued in U.S. Appl. No. 13/059,431.
Jul. 8, 2011 Office Action issued in U.S. Appl. No. 13/059,431.
Jan. 4, 2012 Office Action issued in U.S. Appl. No. 13/059,431.

\* cited by examiner

DRIVING ASSIST SYSTEM

TECHNICAL FIELD

The present invention relates to a driving assist system that assists steering such that a vehicle travels along a set target course.

BACKGROUND ART

Driving assist systems that assist so as to keep a vehicle traveling along a set target course have been gaining widespread use in recent years. Such driving assist systems use various methods to correct a travel position in order to allay driver concern with respect to an obstacle present outside a lane in which the vehicle is traveling.

For example, some methods used in order to allay driver concern with respect to an obstacle present outside the lane in which the vehicle is traveling include: one that corrects a target course toward a direction where there are no obstacles (e.g. Patent Document 1); one in which, on a four-lane road or the like having a plurality of lanes in one direction, a steering reaction force is reduced with respect to a direction opposite a lane adjacent to a host vehicle if another vehicle is traveling in the adjacent lane (e.g. Patent Document 2); and one in which a travel position during a manual travel mode is stored for each size of other vehicles present near the host vehicle during the manual travel mode, and during an automatic travel mode, the travel position is set according to the size of the other vehicle present near the host vehicle (e.g. Patent Document 3).

Patent Document 1: Japanese Patent Application Publication No. JP-A-2004-199286
Patent Document 2: Japanese Patent Application Publication No. JP-A-2001-1927
Patent Document 3: Japanese Patent Application Publication No. JP-A-2004-206451

DISCLOSURE OF THE INVENTION

Problem to be Solved by the Invention

However, with the above-described conventional driving assist systems there are times when the travel position is corrected even though the driver is at ease, and such corrections may cause the driver discomfort.

It is an object of the present invention to resolve the above problem and provide a driving assist system capable of performing appropriate driving assistance that feels more natural to the driver.

Means for Solving the Problem

The present invention is a driving assist system, which assists steering such that a vehicle travels along a preset target course, characterized by including: steering operation detecting means for detecting a steering operation input value generated by a driver; and correcting means for correcting the target course if the detected the steering operation input value is equal to or greater than a predetermined reference.

According to this configuration, when the driver performs a large steering operation, it is determined that traveling along the target course is causing the driver concern and the target course is corrected. Meanwhile, when the driver performs a small steering operation, it is determined that traveling along the target course is not causing the driver concern and the target course is not corrected. Therefore, it is possible to suppress driver discomfort.

The driving assist system of the present invention may further include positional relationship detecting means for detecting a positional relationship between the vehicle and an object present near a lane in which the vehicle is traveling, wherein the correcting means corrects the target course if the detected positional relationship meets a predetermined condition.

According to this configuration, if there is another vehicle, obstacle or the like present near the lane in which the vehicle is traveling, then in consideration of the high likelihood of driver concern it is possible to appropriately correct the target course to a direction that avoids such an object depending on the positional relationship between the vehicle and the object.

Also, in the driving assist system of the present invention, the correcting means may increase a correction amount of the target course as the steering operation input value increases.

According to this configuration, in consideration of the high likelihood of driver concern as the steering operation performed by the driver becomes larger, appropriate target course correction can be achieved by increasing the correction amount of the target course as the steering operation input value increases.

According to the driving assist system of the present invention, the steering operation input value may be a steering torque value or a steering angle.

According to the driving assist system of the present invention, the correcting means may correct the target course within a range such that the vehicle does not depart from a lane in which the vehicle is traveling.

According to the driving assist system of the present invention, the correcting means may correct the target course to a direction of the steering operation performed by the driver.

According to the driving assist system of the present invention, the correcting means may correct the target course to a direction away from an object present near the lane in which the vehicle is traveling.

The driving assist system of the present invention may further include line-of-sight detecting means for detecting a line of sight of the driver, wherein the correcting means corrects the target course if the detected line of sight of the driver is a predetermined direction.

According to this configuration, the driver's unease as determined according to the line-of-sight direction is taken into consideration so as to prevent the target course from being corrected more than is necessary.

The driving assist system of the present invention may further include travel lane detecting means for detecting a shape of the lane in which the vehicle is traveling, wherein the correcting means corrects the target course based on the detected shape of the travel lane.

Effects of the Invention

According to the present invention, by correcting a target course in consideration of a driver's psychological state, appropriate driving assistance can be achieved that feels more natural to the driver.

BEST MODES FOR CARRYING OUT THE INVENTION

Embodiments of the present invention are described in detail below with reference to the drawings.

Figure 1:
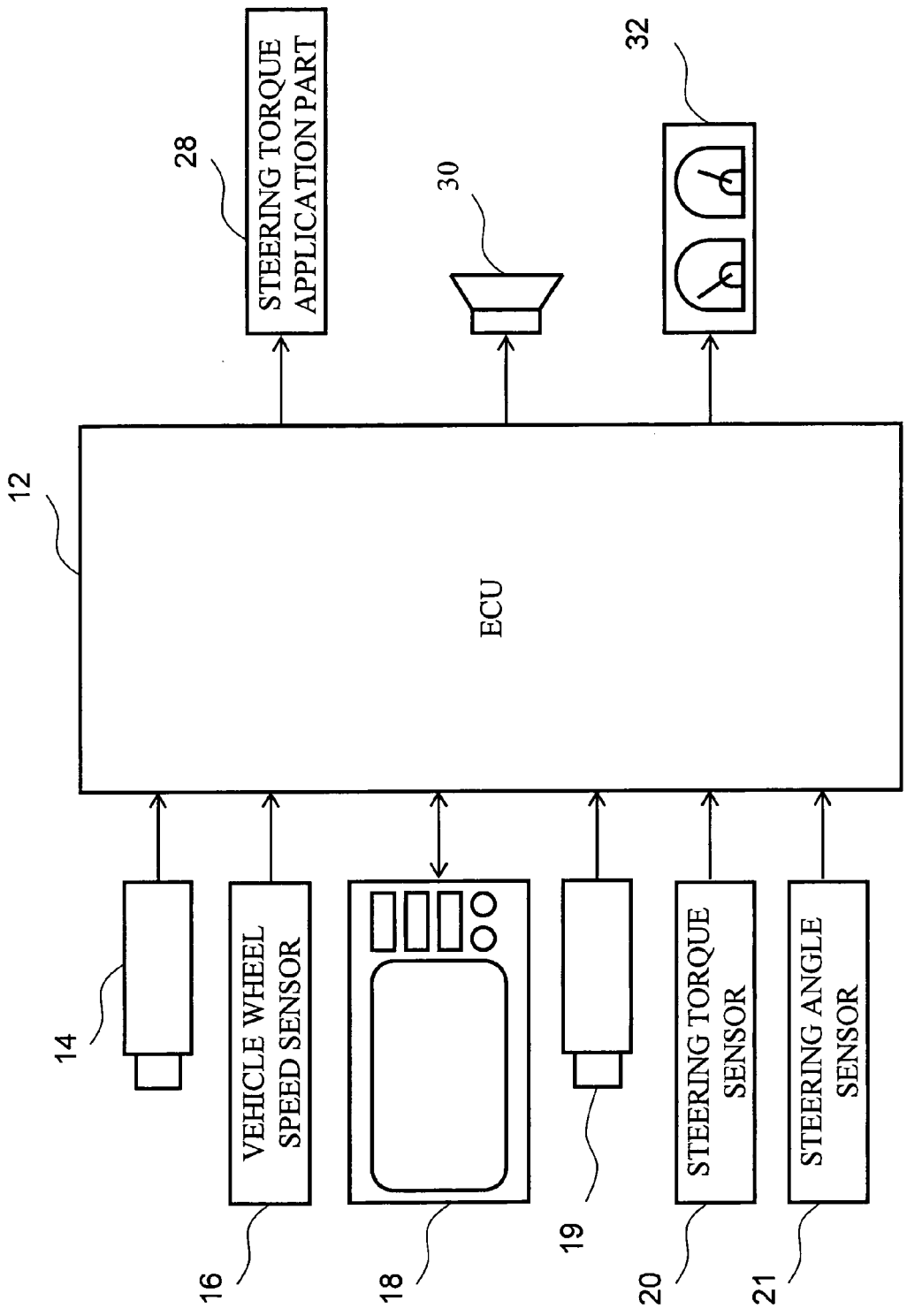
FIG. 1 is a drawing showing a configuration of a driving assist system according to an embodiment of the present invention.

FIG. 1 is a drawing showing a configuration of a driving assist system according to an embodiment of the present invention. A driving assist system 10 shown in FIG. 1 is structured from an electronic control unit (ECU) 12, a forward recognition camera 14, a vehicle wheel speed sensor 16, a car navigation device 18, a line-of-sight estimation camera 19, a steering torque sensor 20, a steering angle sensor 21, a steering angle application part 28, a warning buzzer 30, and a meter 32.

The ECU 12 controls the operation of the car navigation device 18, the warning buzzer 30, and the meter 32. The ECU 12 also controls the operation of the steering torque application part 28 based on various information from the forward recognition camera 14, the vehicle wheel speed sensor 16, the car navigation device 18, the line-of-sight estimation camera 19, the steering torque sensor 20, and the steering angle sensor 21.

The forward recognition camera 14 is installed on a back side of an inner mirror, and images a view forward of a host vehicle. The vehicle wheel speed sensor 16 detects a speed of the host vehicle based on a rotation of a vehicle wheel. The car navigation device 18 holds map information and performs route guidance or the like. The line-of-sight estimation camera 19 images a driver's face and estimates a direction of the driver's line of sight based on an image thus obtained. The steering torque sensor 20 detects a torque when the driver performs a steering operation. The steering angle sensor 21 detects a steering angle when the driver performs a steering operation. It should be noted that instead of the steering angle sensor 21, an EPS motor electric angle sensor may be provided, wherein the steering angle is detected by the ECU 12 converting an electric angle detected by the EPS motor electric angle sensor into the steering angle.

The steering torque application part 28 performs a steering control that prevents the host vehicle from departing a lane. The steering application part 28 is electric power steering for example, and applies the steering torque to the vehicle wheel according to a control of the ECU 12 so that the host vehicle travels along a target course. The warning buzzer 30 performs a steering control similar to that of the steering torque application part 28, wherein if the host vehicle departs or is highly likely to depart from the lane, the warning buzzer 30 sounds an alarm to inform the driver of the situation.

Figure 2:
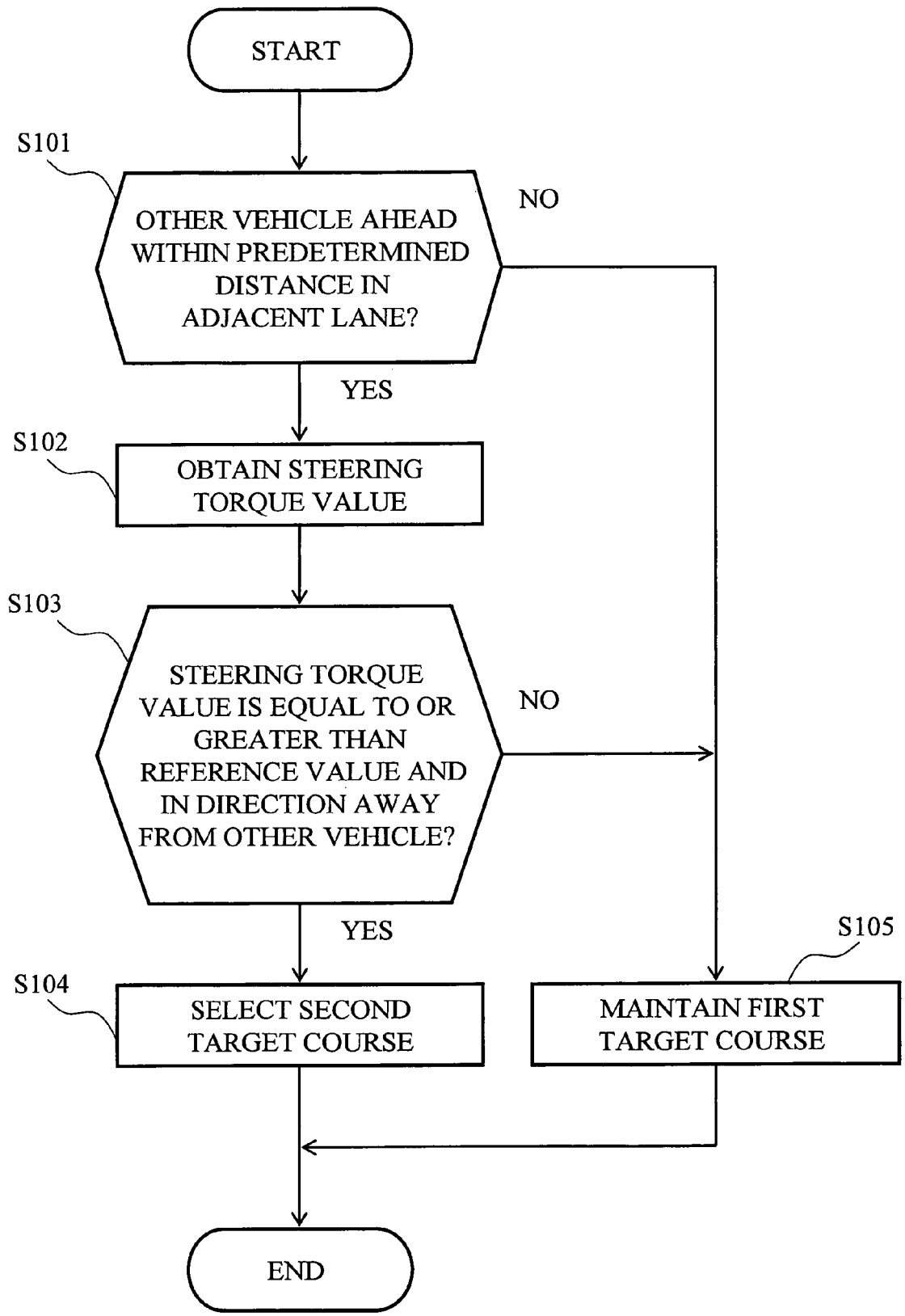
FIG. 2 is a flowchart showing a first operation of a target course correction.
Figure 3:
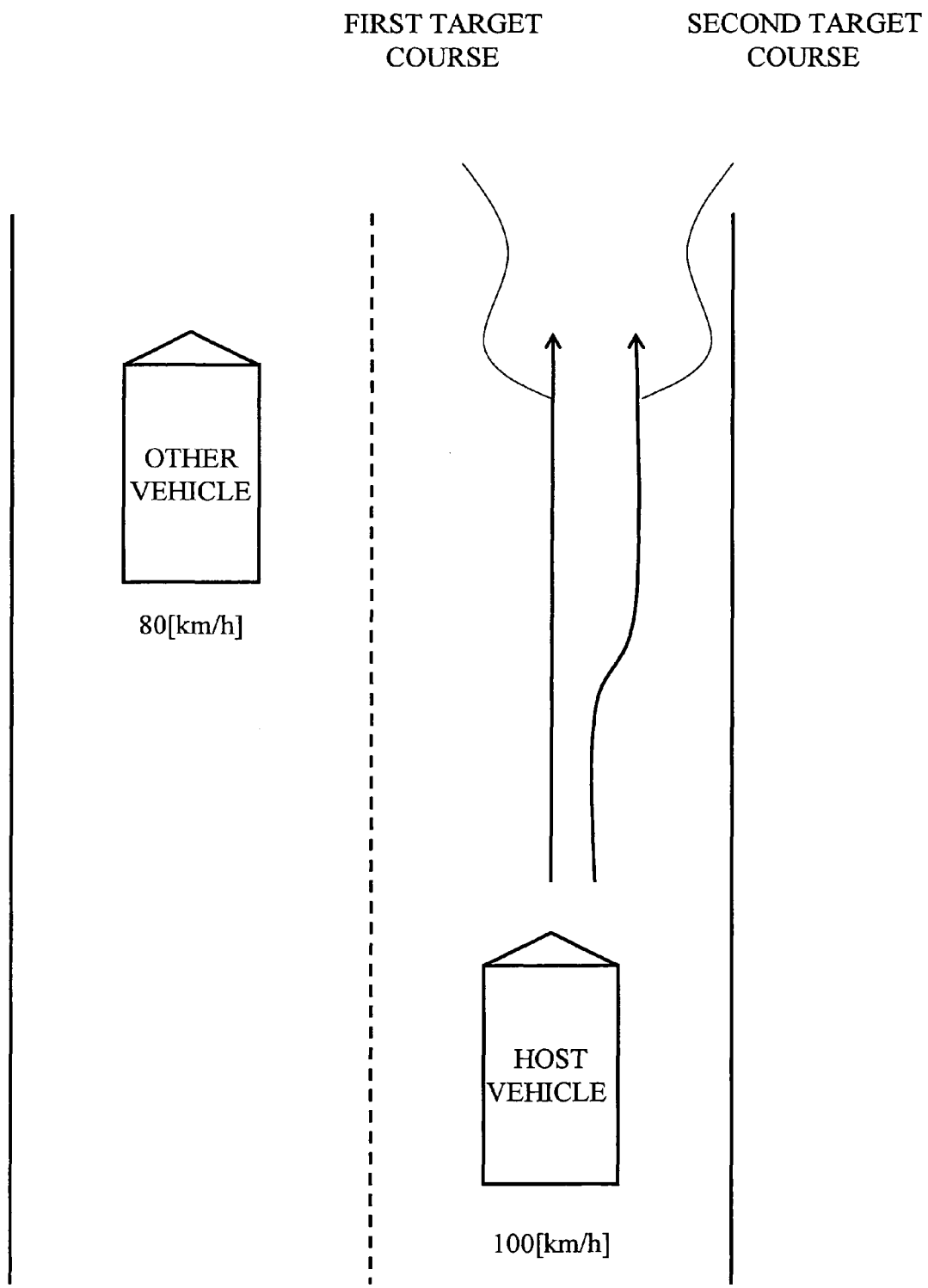
FIG. 3 is a drawing showing a first example of a target course.

An operation for target course correction in the driving assist system 10 will be explained below. FIG. 2 is a flowchart showing a first operation of a target course correction in the driving assist system 10. Referring to FIG. 3, the following explanation regards a road with multiple lanes in at least one direction where another vehicle is traveling in a lane adjacent to the lane in which the host vehicle is traveling. In such case, the host vehicle is traveling either in a first target course corresponding to a course of a center lane or a second target course corresponding to a course that avoids the other vehicle. Note that the host vehicle is initially traveling on the first target course.

The ECU 12 determines whether there is another vehicle ahead of the host vehicle within a predetermined distance (e.g. within a range of 100 [m]) in an adjacent lane (S101). More specifically, the ECU 12 detects a position of another vehicle and a shape of white lines on the road, based on the image taken by the forward recognition camera 14. The ECU 12 can then determine whether there is another vehicle ahead of the host vehicle within a predetermined distance in an adjacent lane based on such detection.

Alternatively, the ECU 12 obtains the position of another vehicle based on the detection results of a millimeter wave radar and a laser sensor (not shown). Then, based on the position of the other vehicle and the shape of the white lines on the road from the image taken by the forward recognition camera 14, the ECU 12 can then determine whether there is another vehicle ahead of the host vehicle within a predetermined distance in an adjacent lane. Here, the millimeter wave radar emits electromagnetic waves toward another vehicle while scanning in the horizontal direction, and receives the electromagnetic waves reflected by an object surface of the other vehicle. The millimeter wave radar then detects a distance from the host vehicle to the other vehicle according to the change in frequency of the received signals and detects a relative speed of the host vehicle with respect to the other vehicle. In addition, the laser sensor detects a time from the emission of laser light until the return of such laser light after reflecting off the other vehicle. The ECU 12 is capable of detecting the position of the other vehicle based on such detection results. Moreover, the ECU 12 may detect the position of another vehicle based on infrastructure information received by a road-vehicle communication device (not shown) from the road-vehicle communication device of the other vehicle. Then, based on the position of the other vehicle and the shape of the white lines on the road from the image taken by the forward recognition camera 14, the ECU 12 can then determine whether there is another vehicle ahead of the host vehicle within a predetermined distance in an adjacent lane.

If there is another vehicle ahead of the host vehicle within a predetermined distance in an adjacent lane, then the ECU 12 obtains from the steering torque sensor 20 a steering torque value that serves as a steering operation input value accompanying the driver's steering operation (S102).

The ECU 12 further determines whether the obtained steering torque value is equal to or greater than a preset reference value (e.g. 2.0 [Nm]) and whether a direction corresponding to the steering torque value is a direction away from the other vehicle (S103).

Figure 4:
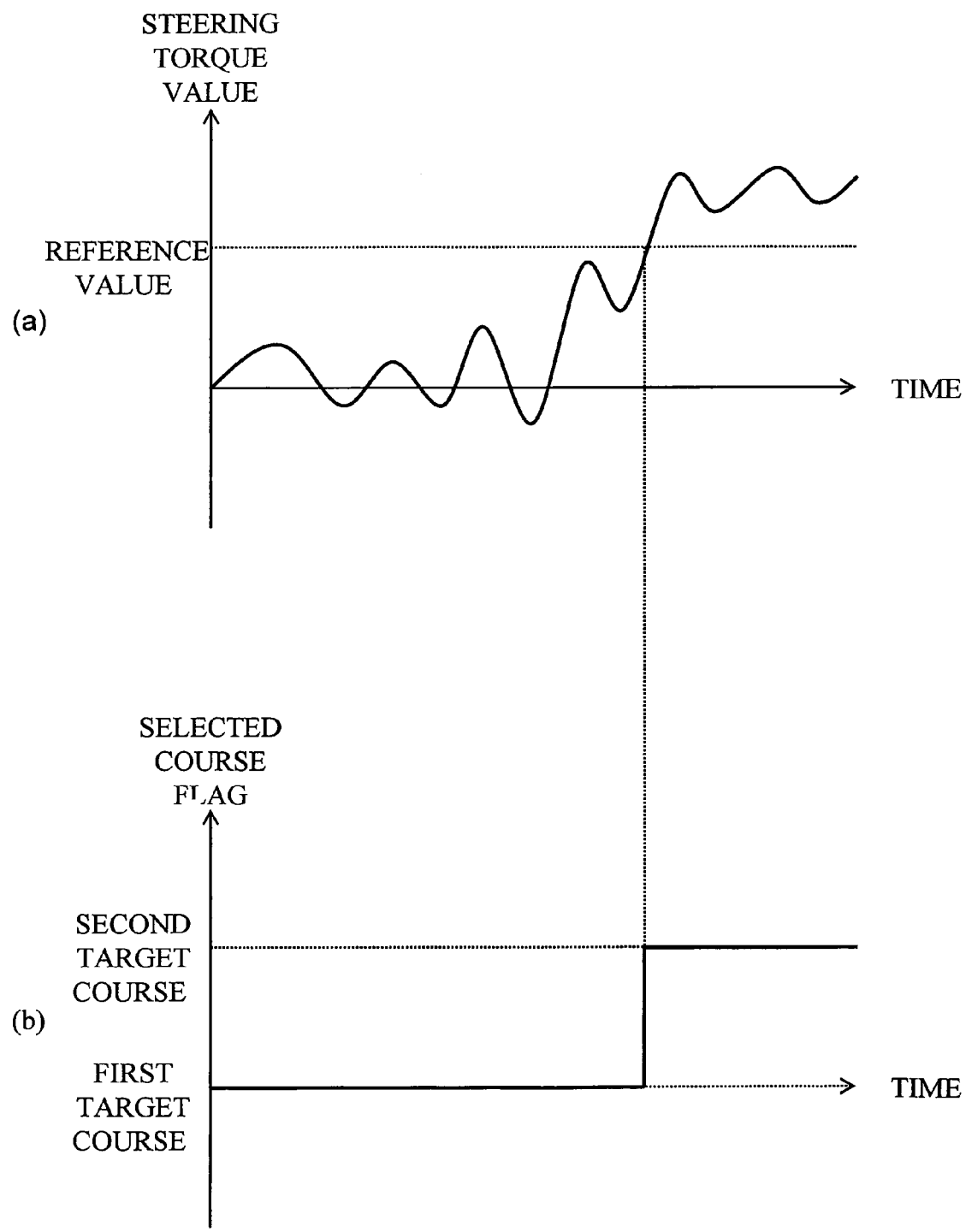
FIGS. 4A and 4B are drawings showing a first corresponding relation between a steering torque value and the target course.

If the steering torque value is equal to or greater than the preset reference value as shown in FIG. 4A, and the direction corresponding to the steering torque value is a direction away from the other vehicle (such as rightward in FIG. 3), then the driver is probably performing a steering operation to move the host vehicle away from the other vehicle because traveling along the first target course is causing the driver concern. In such case, the ECU 12 selects the second target course, which corresponds to a course that avoids the other vehicle, as the course to be traveled by the host vehicle (S104). For example, the ECU 12 changes a selected course flag from the first target course to the second target course, as shown in FIG. 4B.

Figure 5A:
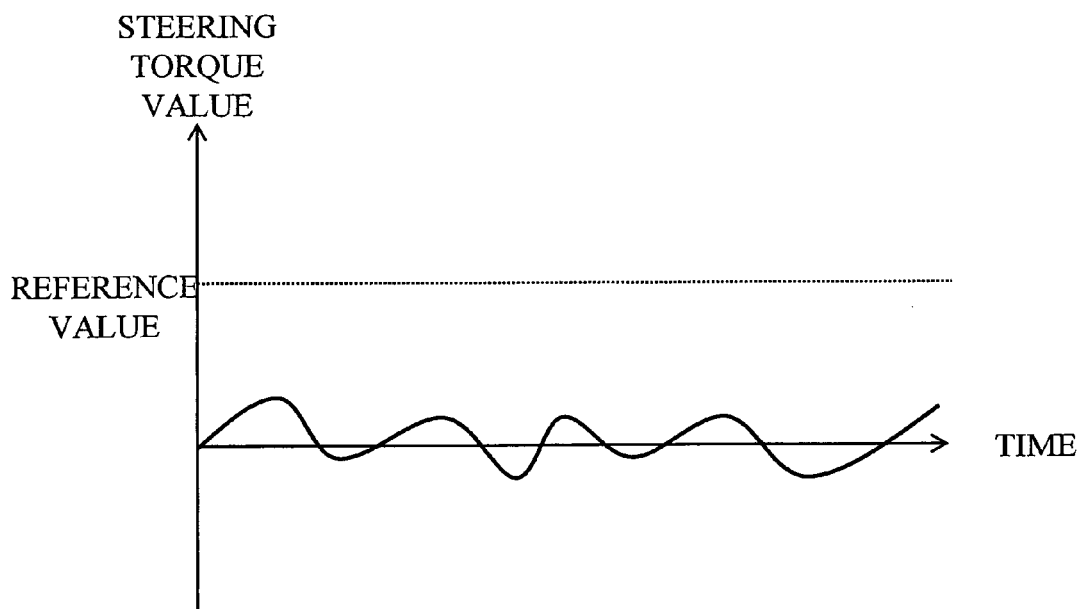
FIGS. 5A and 5B are drawings showing a second corresponding relation between a steering torque value and the target course.
Figure 5B:
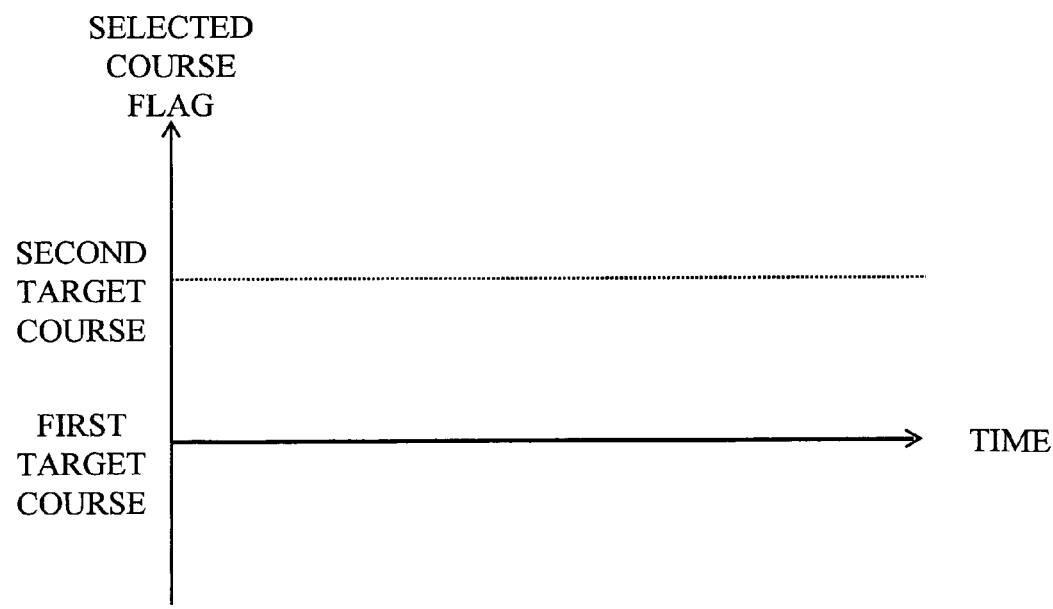

Meanwhile, if the steering torque value is less than the preset reference value as shown in FIG. 5A, and the direction corresponding to the steering torque value is not a direction away from the other vehicle, then traveling along the first target course does not cause the driver concern. Therefore, the driver is probably not performing a steering operation to move the host vehicle away from the other vehicle. In such case, the ECU 12 maintains the first target course as the course to be traveled by the host vehicle (S105). For example, the ECU 12 maintains the selected course flag on the first target course, as shown in FIG. 5B. Thereafter, the ECU 12 continues a control of the steering torque application part 28 such that the host vehicle travels along the first target course, and the steering torque application part 28 applies a steering torque to the vehicle wheel according to the control of the ECU 12.

In addition, if it is determined at S101 that there is no vehicle ahead of the host vehicle within a predetermined distance in the adjacent lane, then the ECU 12 similarly maintains the first target course as the course to be traveled by the host vehicle (S105).

In the above-described embodiment, the steering torque sensor 20 and the steering angle sensor 21 correspond to steering operation detecting means, and the operations of S101 to S105 shown in FIG. 2 and performed by the ECU 12 correspond to correcting means.

Further note that if the steering torque value is equal to or greater than the preset reference value, then the ECU 12 can select the second target course as the course to be traveled by the host vehicle. However, in consideration of a time during which the steering torque value stays equal to or greater than the reference value, the second target course may also be selectable if the steering torque value stays equal to or greater than the preset reference value (e.g. 1.5 [Nm]) for a predetermined time (e.g. 0.5 [s]).

In general the driving assist system 10 has an override function that stops the driving assistance in cases where the driver's steering operation is equal to or greater than a predetermined magnitude. In consideration of this, a reference value for enabling selection of the above second target course is preferably a value that is smaller than the reference value at which the override function is activated. For example, if the reference value at which the override function activates is 2.5 [Nm], then the reference value for enabling selection of the second target course is preferably around 2.0 [Nm].

The ECU 12 may also perform a target course correction that considers the direction of the driver's line of sight. More specifically, the ECU 12 obtains the direction of the driver's line of sight as estimated from imaging of the driver's face by the line-of-sight estimation camera 19. If the line-of-sight direction is facing forward, then the ECU 12 determines that travel along the first target course is not making the driver concerned and thus maintains the first target course. If the line-of-sight direction is facing a direction other than forward, the ECU 12 determines that travel along the first target course is making the driver concerned and thus enables selection of the second target course. In such case, the driver's unease as determined according to the line-of-sight direction is taken into consideration so as to prevent the target course from being corrected more than is necessary. In this case as well, the line-of-sight estimation camera 19 corresponds to line-of-sight detecting means.

In addition, the ECU 12 may determine a timing for selecting the second target course based on a distance to another vehicle ahead in an adjacent lane, or a time until the host vehicle is closest to another vehicle ahead in an adjacent lane.

For example, the ECU 12 obtains a time it takes electromagnetic waves emitted by the millimeter wave radar to reflect off another vehicle and return, or a time it takes laser light emitted by the laser sensor to return after the laser light reflects off another vehicle. The ECU 12 then calculates the distance from the host vehicle to the other vehicle based on such times. If the host vehicle is within a predetermined distance from the other vehicle, then the ECU 12 selects the second target course at S104 in FIG. 2. Accordingly, it is possible to prevent the second target course from being selected beforehand more than necessary so that the driver does not experience discomfort as a result.

Note that the ECU 12 may obtain the host vehicle's speed from the vehicle wheel speed sensor 16 and increase the distance from the host vehicle to the other vehicle, which serves as the reference for determining the timing at which the second target course is selected, in accordance with a faster vehicle speed. Drivers are inclined to look farther ahead at faster vehicle speeds. Therefore if the distance from the host vehicle to the other vehicle, which serves as the reference for determining the timing at which the second target course is selected, is kept constant regardless of the vehicle speed, then the driver may feel that the selection timing is fast in the case of a slow vehicle speed or that the selection timing is slow in the case of a fast vehicle speed. However, by increasing the distance from the host vehicle to the other vehicle, which serves as the reference for determining the timing at which the second target course is selected, in accordance with a faster vehicle speed in this manner, it is possible to appropriately determine the selection timing of the second target course so that the driver is not caused discomfort.

Alternatively the ECU 12 obtains the distance from the host vehicle to another vehicle and a relative speed of the host vehicle with respect to the other vehicle as detected by the millimeter wave radar (not shown). Based on this or the detection result of the laser sensor regarding the time it takes emitted laser light to return after reflecting the laser light off another vehicle, the ECU 12 calculates the distance from the host vehicle to the other vehicle, as well as the relative speed of the host vehicle with respect to the other vehicle. Furthermore, the ECU 12 calculates the time until the host vehicle is closest to the other vehicle ahead in the adjacent lane by dividing the distance from the host vehicle to the other vehicle by the relative speed. If the time until the host vehicle is closest to the other vehicle is within a predetermined time (e.g. 5 seconds), then the second target course is selected at S104 in FIG. 2. Accordingly, it is possible to prevent the second target course from being selected beforehand more than necessary so that the driver does not experience discomfort as a result.

In such cases as well, the operation for obtaining the distance to another vehicle ahead in an adjacent lane, or a time until the host vehicle is closest to another vehicle ahead in an adjacent lane corresponds to positional relationship detecting means.

Figure 6:
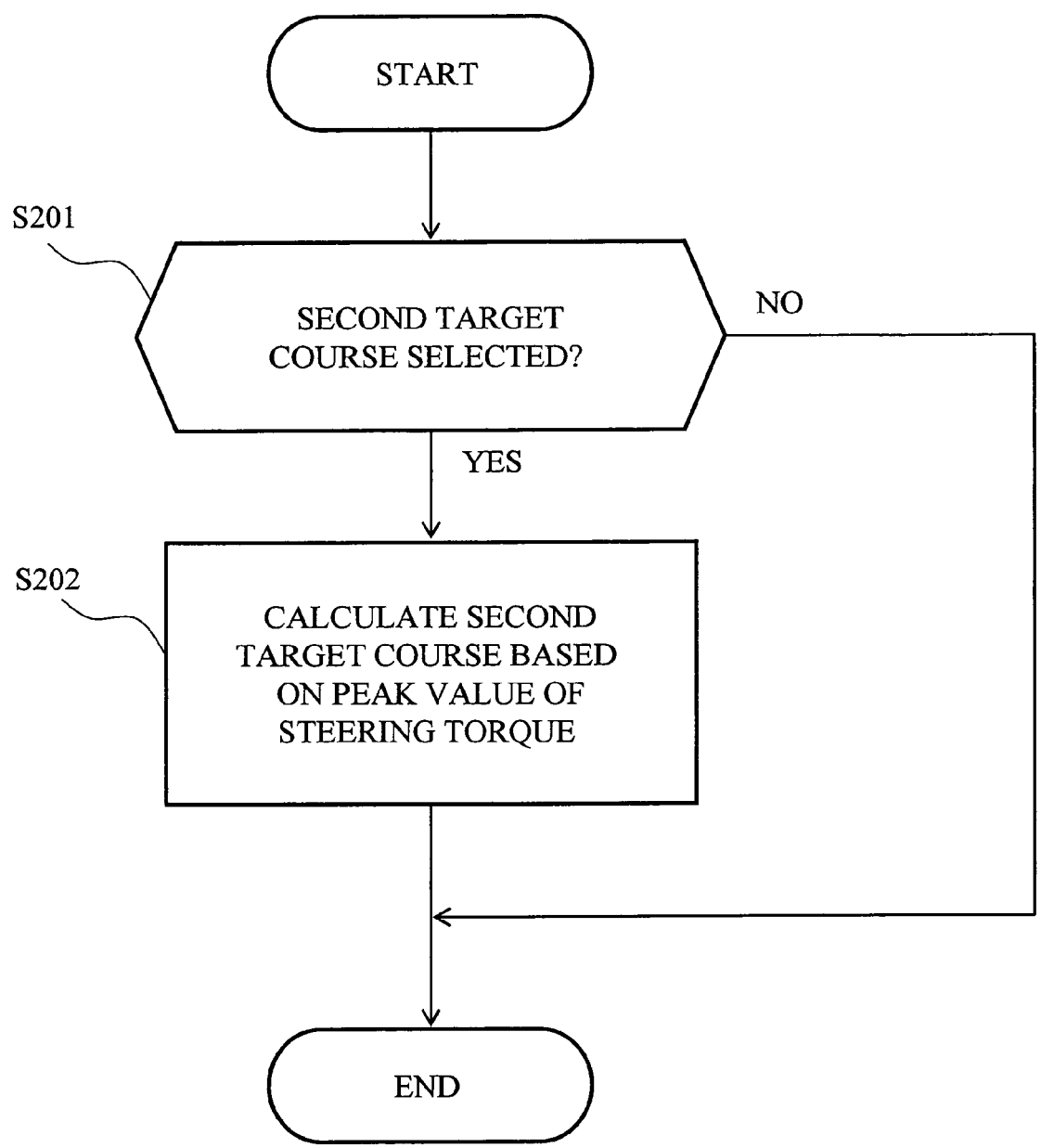
FIG. 6 is a flowchart showing an operation for calculating the target course.

Next, calculation of the second target course will be explained. FIG. 6 is a flowchart showing an operation of a target course calculation in the driving assist system 10.

The ECU 12 determines whether the second target course is selected (S201). If the second target course is selected at S105 in FIG. 2, then the ECU 12 calculates the second target course based on a peak value of the steering torque (S202).

Figure 7A:
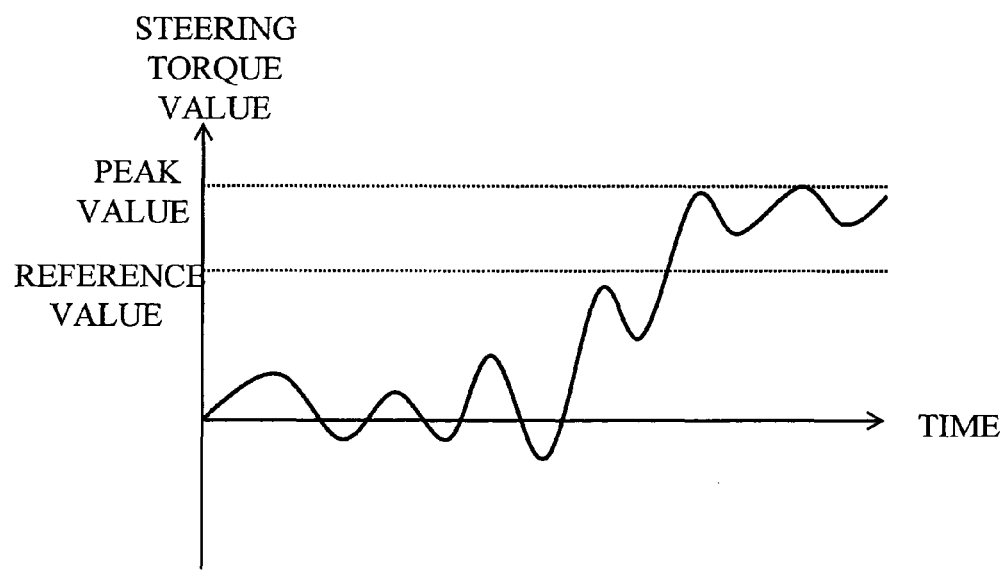
FIGS. 7A and 7B are drawings showing the steering torque value over time (FIG. 7A) and a corresponding relation between a peak value of the steering torque and a course deviation.
Figure 7B:
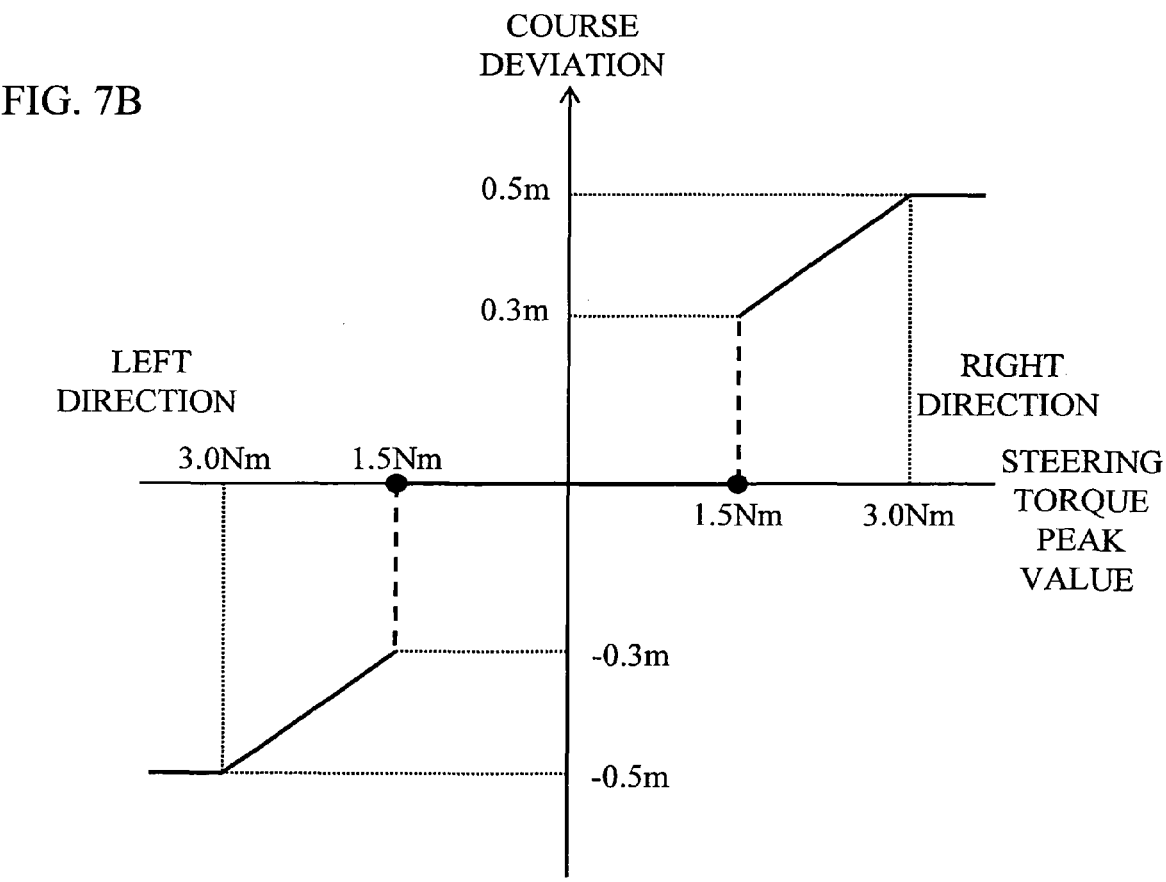
Figure 8:
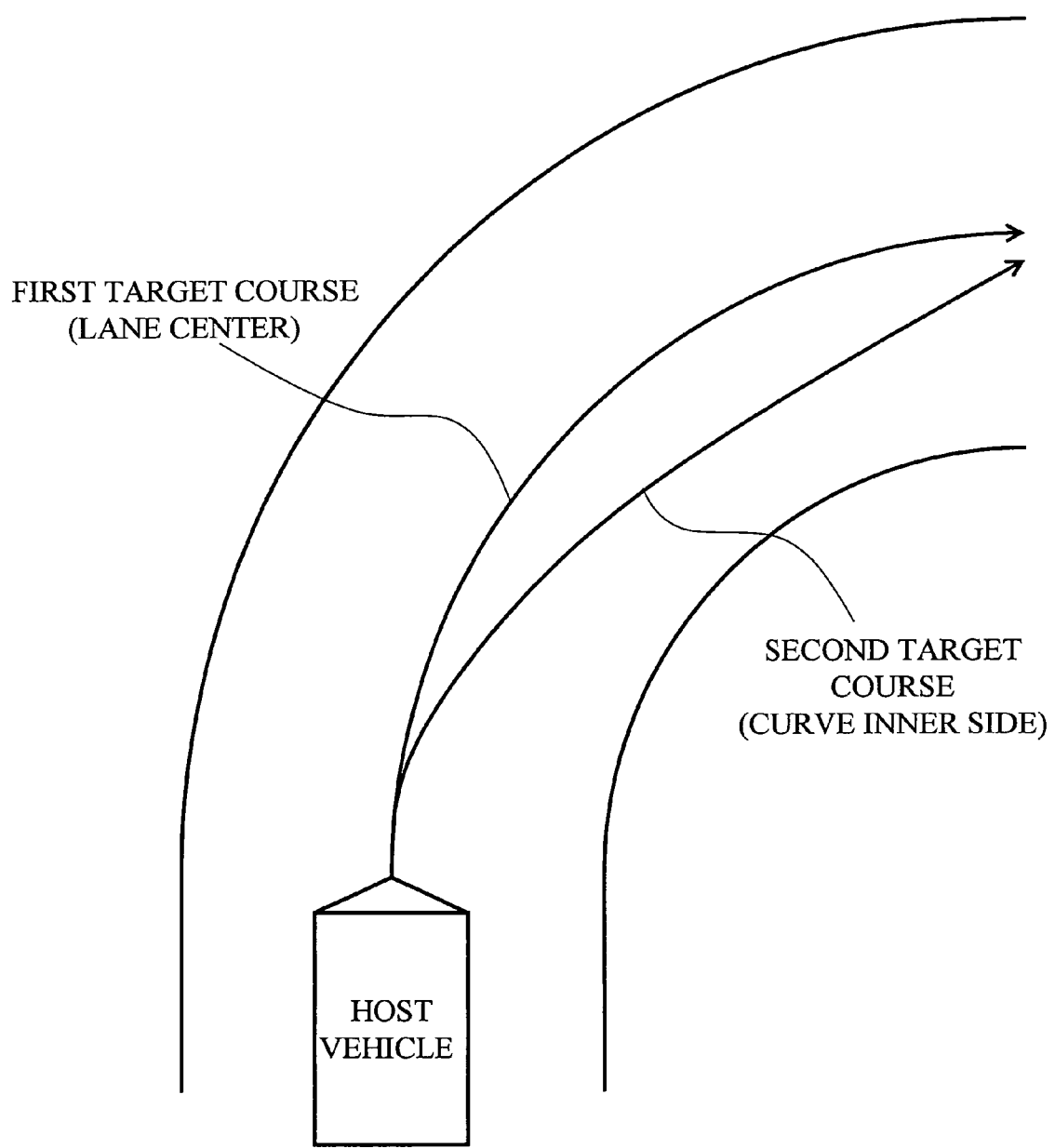
FIG. 8 is a drawing showing a second example of the target course.

FIGS. 7A and 7B are drawings showing the steering torque value over time (FIG. 7A) and a corresponding relation between the peak value of the steering torque and a course deviation (a distance between the first target course and the second target course) (FIG. 7B).

As FIG. 7A shows, the ECU 12 detects the peak value equal to or greater than the reference value for the steering torque, and further determines the course deviation depending on the peak value in accordance with the corresponding relation shown in FIG. 7B. For example, if the peak value of the steering torque is 1.5 [Nm], then the ECU 12 determines the course deviation as 0.3 [Nm], whereas if the peak value of the steering torque is 3.0 [Nm], then the ECU 12 determines the course deviation as 0.5 [m]. Note that the maximum value of the course deviation in FIG. 7B is set at 0.5 [m] in order to prevent the driver from experiencing discomfort due to an excessively large course deviation.

After the second target course is calculated in this manner, the ECU 12 controls the steering torque application part 28 such that the host vehicle travels along the calculated second target course, and the steering torque application part 28 applies a steering torque to the vehicle wheel according to the control of the ECU 12.

In the above embodiment, an operation performed by the ECU 12 in FIG. 6 corresponds to correcting means.

It should be further noted that the maximum value of the course deviation may be set in accordance with a lane width. More specifically, the ECU 12 detects a shape of white lines on the road based on an image taken by the forward recognition camera 14, and detects the lane width based on the shape.

Moreover, the ECU 12 sets the maximum value of the course deviation based on the detected lane width and a width of the host vehicle (vehicle width). More specifically, the ECU 12 sets the maximum value of the course deviation as one-half or less than a value found by subtracting the vehicle width from the lane width. For example, if the lane width is 3.5 [m] and the vehicle width is 1.8 [m], then (3.5−1.8)/2=0.85 [m]. Therefore, if the difference between the first target course corresponding to a course in the center of the lane and the second target course (course deviation) is less than 0.85 [m], then the host vehicle can continue traveling within the lane even if the host vehicle follows the second target course. For this reason, if the lane width is 3.5 [m] and the width of the host vehicle (vehicle width) is 1.8 [m], then the ECU 12 sets the maximum value of the course deviation as equal to or less 0.85 [m] (e.g. 0.6 [m], which includes an extra width allowance).

Some drivers prefer to use a so-called out-in-out maneuver in order to decrease lateral acceleration when passing through a curved section. This may also be taken into consideration when setting the second target course. In such case, the ECU 12 detects the shape of white lines on the road based on the image taken by the forward recognition camera 14. If it is determined that the lane is a curved section based on the shape, then the ECU 12 sets a course leaning toward an inner side of the curve as the second target course. However, based on the image taken by the forward recognition camera 14, the ECU 12 may determine that another vehicle is present in a lane to the right of the lane in which the host vehicle is traveling in a section curving right or that another vehicle is present in a lane to the left of the lane in which the host vehicle is traveling in a section curving left. In such cases, the second target course corresponding to out-in-out travel is preferably not set in order to prevent the host vehicle from approaching the other vehicle. In this case, the forward detection camera 14 corresponds to travel lane detecting means.

Figure 9:
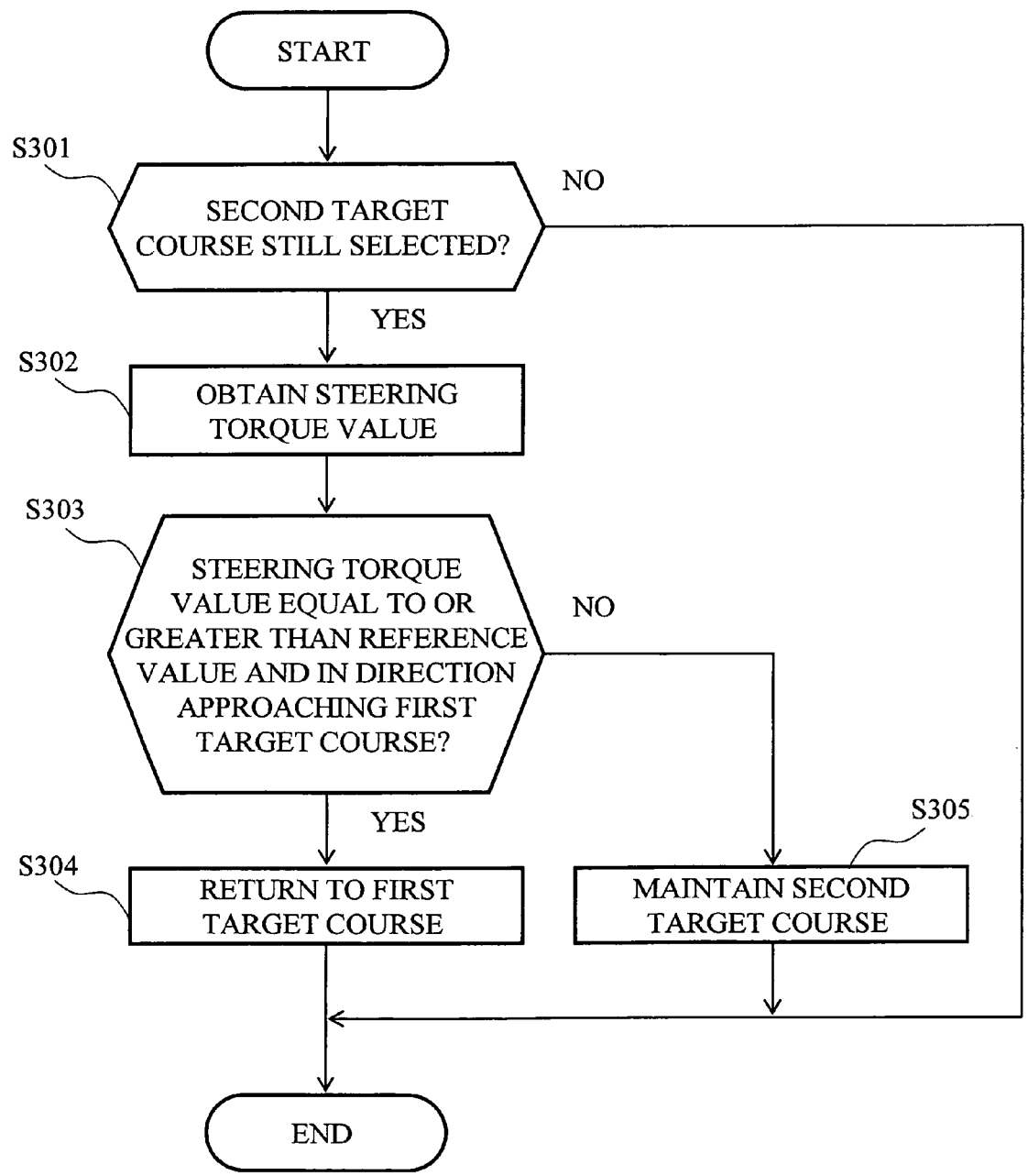
FIG. 9 is a flowchart showing a second operation of the target course correction.

A second operation for target course correction will be explained next. FIG. 9 is a flowchart showing a second operation of a target course correction in the driving assist system 10.

The ECU 12 determines whether the second target course is still selected (S301). If the second target course is still selected, then the ECU 12 obtains from the steering torque sensor 20 a steering torque value that accompanies the driver's steering operation (S302).

The ECU 12 further determines whether the obtained steering torque value is equal to or greater than a preset reference value (e.g. 2.0 [Nm]) and whether a direction corresponding to the steering torque value is a direction approaching the first target course (S303).

If the steering torque is equal to or greater than the preset reference value, and the direction corresponding to the steering torque value is a direction approaching the first target course, then the driver is probably performing a steering operation to return to the first target course because traveling along the second target course is causing the driver concern. In such case, the ECU 12 returns the target course from the second target course to the first target course (S303).

Figure 10:
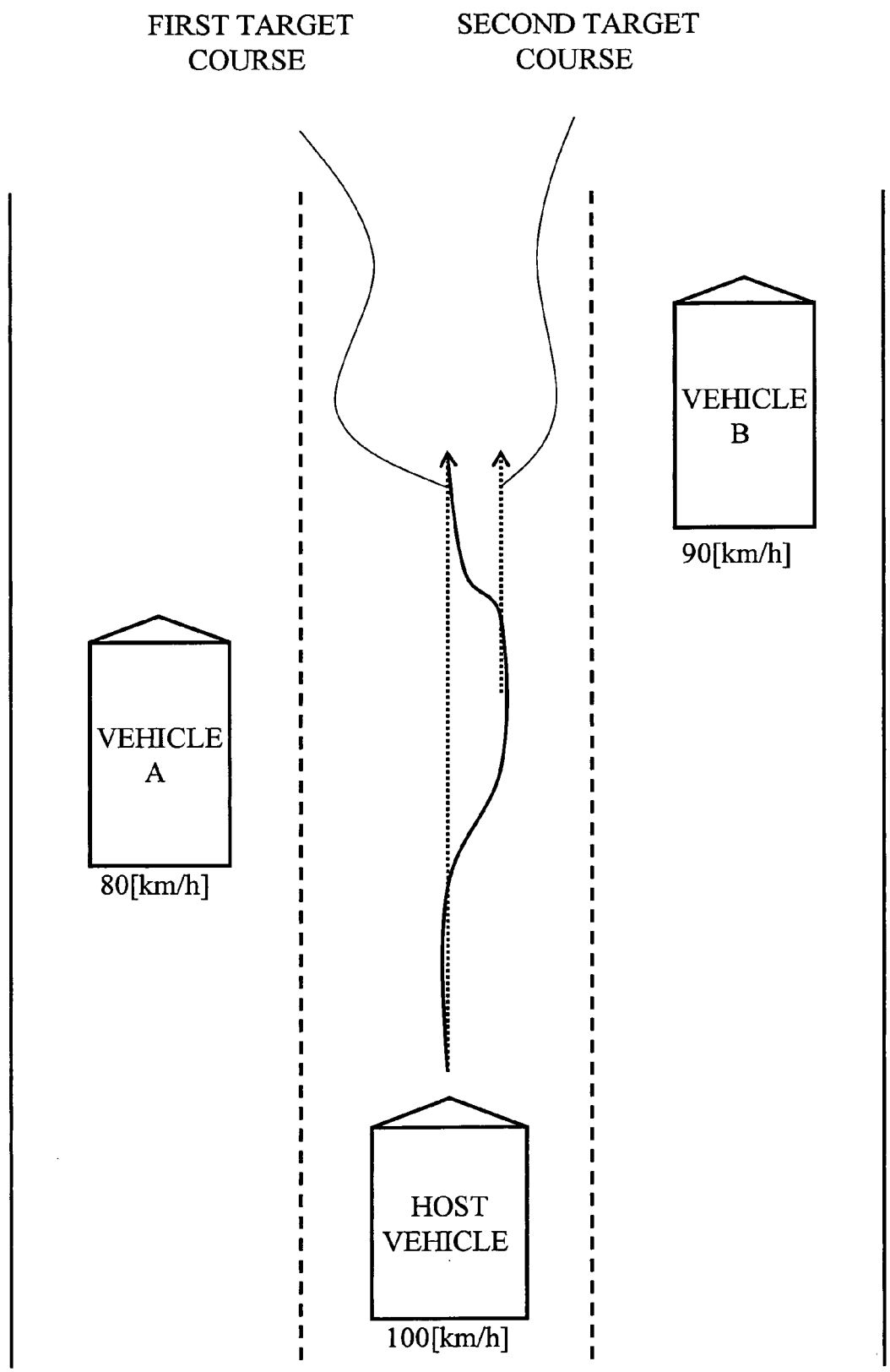
FIG. 10 is a drawing showing a third example of the target course.

For example, referring to FIG. 10, the target course is changed from the first target course to the second target course in order to move away from a vehicle A present in an adjacent lane to the left of the lane in which the host vehicle is traveling. Thereafter, the driver performs a steering operation in order to move away from a vehicle B present in an adjacent lane to the right of the lane in which the host vehicle is traveling. If the steering torque value accompanying the steering operation is equal to or greater than the preset reference value and the direction corresponding to the steering torque value is a direction approaching the first target course, then the target course returns from the second target course to the first target course. Thereafter, the ECU 12 performs a control of the steering torque application part 28 such that the host vehicle travels along the first target course, and the steering torque application part 28 applies a steering torque to the vehicle wheel according to the control of the ECU 12.

Referring to FIG. 9 again, if the steering torque value is less than the preset reference value, and the direction corresponding to the steering torque value is not a direction approaching the first target course (a negative determination at S303), then traveling along the second target course does not cause the driver concern. Therefore, the driver is probably not performing a steering operation to move the host vehicle away from the other vehicle. In such case, the ECU 12 maintains the second target course as the course to be traveled by the host vehicle (S304). Thereafter, the ECU 12 continues a control of the steering torque application part 28 such that the host vehicle travels along the second target course, and the steering torque application part 28 applies a steering torque to the vehicle wheel according to the control of the ECU 12.

In the above embodiment, an operation performed by the ECU 12 from S301 to S304 in FIG. 9 corresponds to correcting means.

Thus in the driving assist system 10, when the driver performs a large steering operation, the ECU 12 determines that traveling along the target course set at such time is causing the driver concern and consequently selects a target course that moves away from another vehicle present ahead in an adjacent lane within a predetermined distance of the host vehicle. Meanwhile, when the driver performs a small steering operation, the ECU 12 determines that traveling along the target course set at such time is not causing the driver concern and consequently maintains the target course. Therefore, appropriate driving assistance can be achieved that feels more natural to the driver.

Note that in the above embodiment, the ECU 12 obtains from the steering torque sensor 20 the steering torque value accompanying the driver's steering operation. However, the ECU 12 may obtain from the steering angle sensor 21 the steering angle that serves as a steering operation input value accompanying the driver's steering operation. If the steering angle is equal to or greater than a preset reference value, then selection of the second target course can be enabled or returning to the first target course can be enabled.

The above embodiment also includes an explanation of a target course correction when the driver performs a steering operation for moving away from another vehicle present ahead in an adjacent lane. However, the present invention may be similarly applied to a target course correction when the driver performs a steering operation for moving away from an object such as an obstacle other than a vehicle.

Industrial Applicability

As described above, the driving assist system according to the present invention is capable of performing appropriate driving assistance that feels more natural to the driver and has utility as a driving assist system.

The invention claimed is:

1. A driving assist system for use with a vehicle that can be maneuvered via a driver's steering operation, the system being configured to assist steering by enabling the vehicle to travel along a preset target course within a lane, the driving assist system comprising:
    a steering operation sensor configured to detect an input value of the driver's steering operation;
    an information sensor configured to detect information relating to a vicinity around the vehicle; and
    a controller configured to correct the preset target course, and thereby create a second target course within the same lane that is different from the preset target course, the preset target course being corrected based on the detected information and the detected driver's steering operation input value,
    such that the controller corrects the preset target course within the lane if: 1) the information indicates that an object is disposed in the vicinity around the vehicle, and 2) the driver's steering operation input value is equal to or greater than a predetermined reference; and the controller does not correct the target course within the lane if: 1) the information does not indicate that the object is disposed in the vicinity around the vehicle, or 2) the driver's steering operation input value is less than the predetermined reference.

2. The driving assist system according to claim 1, further comprising:
    a positional relationship detector to detect a positional relationship between the vehicle and the object in the vicinity of the vehicle, wherein the controller corrects the target course if the detected positional relationship meets a predetermined condition.

3. The driving assist system according to claim 1, wherein the controller increases a correction amount of the target course as the input value of the steering operation increases.

4. The driving assist system according to claim 1, wherein the input value of the steering operation is one of a steering torque value and a steering angle.

5. The driving assist system according to claim 1, wherein the controller corrects the target course within a range such that the vehicle does not depart from a lane in which the vehicle is traveling.

6. The driving assist system according to claim 1, wherein the controller corrects the target course to a direction of the steering operation performed by the driver.

7. The driving assist system according to claim 6, wherein the controller corrects the target course to a direction away from the object around the vehicle.

8. The driving assist system according to claim 1, further comprising:
    a line-of-sight detector to detect a line of sight of the driver, wherein the controller corrects the target course if the detected line of sight of the driver is in a predetermined direction.

9. The driving assist system according to claim 1, further comprising:
    a travel lane detector to detect a shape of a lane in which the vehicle is traveling, wherein the controller corrects the target course based on the detected shape of the travel lane.

10. The driving assist system according to claim 1, wherein the controller corrects the target course if the controller determines that: an object is present in the vicinity of the vehicle, and the input value of the steering operation stays equal to or greater than a predetermined reference for a predetermined time.

11. A driving assist method for use with a vehicle that can be maneuvered via a driver's steering operation, the system being configured to assist steering by enabling the vehicle to travel along a preset target course within a lane, the driving assist method comprising:
    detecting an input value of the driver's steering operation;
    detecting information relating to a vicinity around the vehicle;
    determining whether the information indicates presence of an object in the vicinity of the vehicle; and
    correcting the preset target course and thereby creating a second target course within the same lane that is different from the preset target course, the preset target course being corrected based on the detected information and the detected driver's steering operation input value,
    such that the preset target course is corrected within the lane if: 1) the information indicates that an object is disposed in the vicinity around the vehicle, and 2) the driver's steering operation input value is equal to or greater than a predetermined reference; and the target course is not corrected within the lane if: 1) the information does not indicate that the object is disposed in the vicinity around the vehicle, or 2) the driver's steering operation input value is less than the predetermined reference.

12. The driving assist method according to claim 11, further comprising:
    detecting a positional relationship between the vehicle and the object in the vicinity of the vehicle, wherein the target course is corrected if the detected positional relationship meets a predetermined condition.

13. The driving assist method according to claim 11, further comprising:
    detecting a line of sight of the driver, wherein the target course is corrected if the detected line of sight of the driver is in a predetermined direction.

14. The driving assist method according to claim 11, further comprising:

detecting a shape of a lane in which the vehicle is traveling, wherein the target course is corrected based on the detected shape of the travel lane.

\* \* \* \* \*